United States Patent Office 3,344,158
Patented Sept. 26, 1967

3,344,158
17α - (3′,3′,3′ - TRIFLUOROPROP-1′-YNYL)-17β-HYDROXY AND -ALKOXY DERIVATIVES OF OESTRA-1,3,5(10)-TRIENE AND PROCESS FOR THEIR PREPARATION
Peter Feather and Vladimir Petrow, London, England, assignors to The British Drug Houses Limited
No Drawing. Filed Apr. 1, 1965, Ser. No. 444,814
Claims priority, application Great Britain, Apr. 3, 1964, 13,935/64
9 Claims. (Cl. 260—397.5)

This invention is for improvements in or relating to organic compounds and has particular reference to a new class of steroidal materials, namely the 17α-(3′,3′,3′-trifluoroprop-1′-ynyl)-17β-hydroxy derivatives of oestra-1,3,5(10)-triene and the derived 17β-alkoxy-steroids, and to a process for their preparation.

The new compounds of the present invention have valuable biological properties or may readily be converted into compounds having valuable biological properties. Thus, in general, they have claudogenic properties (see Petrow, J. Pharm. Pharmacol, 1960, 12, 1704) and may have oestrogenic, progestational, ovulation inhibiting and gonadotrophin-inhibiting properties.

It is an object of the present invention to provide new 17α-(3′,3′,3′-trifluoroprop-1′-ynyl)-17β-hydroxy- and 17α-(3′,3′,3′-trifluoroprop-1′-ynyl))-17β-alkoxy derivatives of oestra-1,3,5(10)-triene having apart from substituents in Rings A, B, C and D, and further unsaturated linkages in Rings B, C and D, the general formula

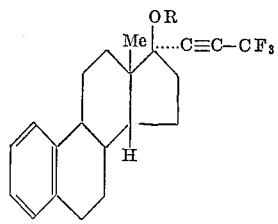

(I)

wherein R represents an atom of hydrogen or an alkyl group containing up to 5 carbon atoms.

According to the present invention, there is provided a process for the preparation of 17α-(3′,3′,3′-trifluoroprop-1′-ynyl)-17β - hydroxy - derivatives of oestra - 1,3,5(10)-triene having, apart from optional substituents in Rings A, B, C and D and further unsaturated linkages in Rings B, C and D the general Formula I, which process comprises reacting the corresponding 17-oxo-steroid with a derivative of 3,3,3-trifluoroprop-1-yne in which the atom of hydrogen has been replaced by an equivalent of a metal selected from the group consisting of lithium, sodium, potassium, calcium, magnesium and zinc, including the mono-Grignard derivatives.

The derivative may be prepared directly from free trifluoropropyne or the trifluoropropyne may be prepared in situ. One preferred derivative is trifluoropropynyl magnesium bromide, which is conveniently prepared by condensing an excess of gaseous 3,3,3-trifluoropropyne into a solution of ethyl magnesium bromide in an anhydrous non-hydroxylic organic solvent such as ether or tetrahydrofuran, cooled below —60° C., with exclusion of moisture. The mixture is then stirred under reflux, usually for one to two hours, and the 17-oxo-steroidal starting material, preferably in approximately one tenth to one fifth molecular proportion relative to the Grignard reagent, is next added, in a non-hydroxylic solvent such as ether, tetrahydrofuran, benzene or toluene. The resulting mixture is stirred usually at room temperature, for up to 24 hours, while the excess of trifluoropropyne is allowed to boil off. The mixture is then treated with reagents currently employed for decomposing the products of organo-metallic reactions including the Grignard-type reactions (see Grignard Reactions of Non Metallic Substances, Kharasch and Reinmuth, Constable), for example water, or an aqueous solution of ammonium chloride, before working-up in a manner used for reactions of the Grignard type. The product may be purified by recrystallisation from a suitable solvent, and when necessary by chromatography.

An alternative derivative of 3,3,3,-trifluoroprop-l-yne is lithium trifluoropropynyl which is conveniently prepared by condensing gaseous 3,3,3-trifluoropropyne into a suspension of lithamide in liquid ammonia. The mixture is stirred under reflux, usually for approximately 1 hour, and the 17-oxo-steroidal starting material, preferably in approximately one twentieth to one fifth molecular proportion relative to the lithium, is next added in a non-hydroxylic solvent such as ether or tetrahydrofuran. The resulting mixture is stirred under reflux, usually for approximately four hours, and is then treated with a suitable reagent for decomposing the products of organo-metallic reactions, such as solid ammonium chloride. The ammonia and excess of 3,3,3-trifluoropropyne are allowed to evaporate, the residue is worked up in the usual manner, and the product is purified by recrystallisation from a suitable solvent, and when necessary by chromatography.

When desired, the 17α-(3′,3′,3′-trifluoroprop-1′-ynyl)-17β-hydroxy steroidal derivative may be converted into the corresponding 17β-alkoxy derivative, for example by the method revealed in our Belgian Patent No. 510,139.

In the preferred method, the 17β-hydroxy-steroid in an anhydrous, non-hydroxylic solvent such as tetrahydrofuran is added to an excess of sodamide in liquid ammonia, and the mixture is stirred for 1 to 2 hours. The alkyl halide, for example, methyl iodide in a solvent such as tetrahydrofuran is added, and after stirring for a further 1–4 hours, or in some cases for up to 24 hours, the mixture is poured onto ice. The alkylated product is recovered by filtration or by extraction with a solvent such as ether and is purified by recrystallisation from a suitable solvent, and when necessary, by chromatography.

It will be apparent to those skilled in the art that the process of the invention may be applied to steroids containing, in addition to the oxo-group at position 17, a variety of substituents in Rings A, B, C and D, and, in addition to the aromatic system of Ring A, a variety of unsaturated linkages in Rings B, C and D.

Thus, the process of the invention may be applied to Ring A aromatic steroids containing optional unsaturated linkages at $\Delta^6$, $\Delta^7$, $\Delta^{9(11)}$, $\Delta^{8(9)}$, $\Delta^{8(14)}$ or $\Delta^{14}$, and to steroids in which Ring B is also aromatic.

Alkyl, alkenyl and alkynyl groups containing up to 5 carbon atoms, such, for example, as methyl vinyl and propynyl groups, and in particular, methyl groups at positions 1, 2, 4 and 6, do not interfere with the process of the invention.

Hydroxyl groups, and in particular hydroxyl groups at positions 1, 3, 5, 6 and 11 do not interfere with the process of the invention, but may in certain cases, be advantageously protected by prior conversion into the tetrahydropyranyl derivative, and subsequently be regenerated. Acylated hydroxyl groups may be hydrolysed during the course of the reaction or working-up procedure and require subsequent reacylation.

Alkoxy-groups, and in particular methoxy- and ethoxy-groups at position 3 do not interfere with the process of the invention.

Atoms of chlorine or fluorine, and in particular, atoms of chlorine or fluorine at positions 2, 4 and 6, do not interfere with the process of the invention.

Oxo-groups, and in particular, oxo-groups at position 6, require protection by ketal, thioketal, enamine or enol ether formation, and subsequent regeneration.

The process of the invention is particularly applicable to derivatives of oestra-1,3,5(10)-trien-17-one represented by the general Formula II and III.

where

R represents H or Me,
R' represents H or Me or Cl or F,
R" represents H or OH or OR''' and
R''' represents an ankyl group containing up to 5 carbon atoms.

In Formula II an additional double bond may be present at $\Delta^6$ or $\Delta^{8(9)}$.

The process of the invention may be applied to prepare the following compounds from the corresponding 17-oxo steoroidal starting materials:

17α-trifluoropropynyl-oestra-1,3,5(10)-trien-3,17β-diol
17α-trifluoropropynyl-3-methoxy-oestra-1,3,5(10)-trien-17β-ol
17α-trifluoropropynyl-3-ethoxy-oestra-1,3,5(10)-trien-17β-ol
17α-trifluoropropynyl-3-propoxy-oestra-1,3,5(10)-trien-17β-ol
17α-trifluoropropynyl-oestra-1,3,5(10)-trien-17β-ol
17α-trifluoropropynyl-4-methyl-oestra-1,3,5(10)-trien-17β-ol
17α-trifluoropropynyl-3,17β-dimethoxy-oestra-1,3,5(10)triene
17α-trifluoropropynyl-3-ethoxy-17β-methoxy-oestra-1,3,5(10)-triene
17α-trifluoropropynyl-3-propoxy-17β-methoxy-oestra-1,3,5(10)-triene
17α-trifluoropropynyl-17β-methoxy-oestra-1,3,5(10)-triene
17α-trifluoropropynyl-4-methyl-17β-methoxy-oestra-1,3,5(10)-triene
17α-trifluoropropynyl-3-methoxy-17β-ethoxy-oestra-1,3,5(10)-triene
17α-trifluoropropynyl-3,17β-diethoxy-oestra-1,3,5(10)-triene
17α-trifluoropropynyl-3-propoxy-17β-ethoxy-oestra-1,3,5(10)-triene
17α-trifluoropropynyl-17β-ethoxy-oestra-1,3,5(10)-triene
17α-trifluoropropynyl-4-methyl-17β-ethoxy-oestra-1,3,5(10)-triene
17α-trifluoropropynyl-1-methyl-oestra-1,3,5(10)-trien-3,17β-diol
17α-trifluoropropynyl-3,17β-dimethoxy-1-methyl-oestra-1,3,5(10)-triene
17α-trifluoropropynyl-3-methoxy-1-methyl-oestra-1,3,5(10)-trien-17β-ol.

Following is a description by way of example of methods of carrying the invention into effect:

EXAMPLE 1

*17α-trifluoropropynyl-3-methoxy-oestra-1,3,5(10)-trien-17β-ol*

To magnesium (0.94 g.) suspended in anhydrous ether (15 ml.) under nitrogen with exclusion of moisture, in a carefully-dried apparatus fitted with Dry Ice reflux condenser was added, with stirring during 30 minutes, ethyl bromide (4.5 g.) in ether (15 ml.). When reaction ceased, the mixture was cooled to −70° C. and anhydrous liquid 3,3,3-trifluoropropyne (12 ml.), (prepared by the method of W. G. Finnegan and W. P. Norris, J. Org. Chem., 1963, 28, 1139), was distilled into the mixture. The cooling-bath was removed and the mixture was stirred under reflux for 1½ hours. Oestrone 3-methyl ether (2.0 g.) in anhydrous tetrahydrofuran (100 ml.) was added and the mixture was stirred at room temperature for 16 hours, excess of trifluoropropyne being allowed to boil off. Dilute aqueous ammonium chloride solution was added dropwise with stirring, the mixture was extracted with ether and the ethereal solution was washed with ammonium chloride solution and then with water, dried over sodium sulphate, and the solvent was evaporated at reduced pressure. The residue was purified by chromatography on alumina (100 g.), unchanged oestrone 3-methyl ether being eluted with benzene and the required product (1.31 g., M.P. 159–164° C.), with benzene containing 10% of ether. Recrystallisation from aqueous methanol afforded pure 17α-trifluoropropynyl-3-methoxyoestra-1,3,5(10)-trien-17β-ol, M.P. 167.5–168.5° C., $[\alpha]_D^{25}$ −5.6° (c., 1.008 in dioxan), $\lambda_{max.}$ 278 mμ (ε, 1,990) $\lambda_{max.}$ 286 mμ (ε, 1,910), $\lambda_{inf}$ 219 mμ (ε, 8,330), $\gamma_{max.}^{CCl_4}$ 3620, 2250 cm.$^{-1}$, $\gamma_{max.}^{CS_2}$ 1275, 1147, 1043 cm.$^{-1}$

*17α-trifluoropropynyl-3,17β-dimethoxy-oestra-1,3,5(10)-triene*

Sodium metal (0.23 g.) and a trace of ferric nitrate were added to liquid ammonia (50 ml.) and the mixture was stirred under reflux until the blue colour disappeared. The mixture was cooled at −60 to −70° C. and 17α-trifluoropropynyl-3-methoxy-oestra - 1,3,5(10)-trien-17β-ol (0.8 g.) in anhydrous tetrahydrofuran (25 ml.) was added slowly during 10 minutes, and the mixture was stirred for 1½ hours. Methyl iodide (0.65 ml.) in tetrahydrofuran (10 ml.) was added during 10 minutes, stirring was continued at −60 to −70° C. for a further 3 hours, and the mixture was poured onto ice. The precipitate was collected and purified by recrystallisation from methanol, affording 17α-trifluoropropynyl-3,17β-dimethoxy-oestra-1,3,5(10)-triene, M.P. 80–80.5° C., $[\alpha]_D^{25}$ −10.8° (c., 1.634 dioxan), $\lambda_{max.}$ 286 mμ (ε, 1,900), $\lambda_{max.}$ 277.5 mμ (ε, 2,000), $\lambda_{inf}$ 227.5 mμ (ε,7,650), $\lambda_{inf}$ 220 mμ (ε, 8,700). The compound is a highly potent claudogenic agent with minimal oestrogenic activity.

EXAMPLE 2

*17α-trifluoropropynyl-oestra-1,3,5(10)-trien-3,17β-diol*

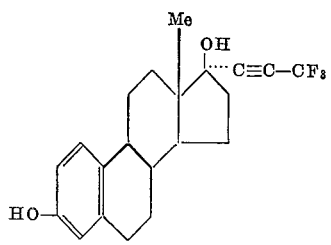

Lithium (0.97 g.) and a trace of ferric nitrate were added to anhydrous liquid ammonia and the mixture was stirred under reflux until the blue colour disappeared, and then cooled to −70° C. Anhydrous liquid 3,3,3-trifluoropropyne (12 ml.) was distilled into the mixture, the cooling-bath was removed, and the mixture was stirred under reflux for 1 hour. Oesterone (5 g.) in anhydrous tetrahydrofuran (200 ml.) was added, and the mixture was stirred under reflux for 4 hours. Ammonium chloride (5 g.) was added and the ammonia was allowed to evaporate. The residue was extracted with ether, and the resulting black solution was washed with water dried over sodium sulphate and allowed to flow through a short alumina column, eluting with more ether. The ethereal solution was evaporated at reduced pressure and the residue was purified by recrystallisation from benzene, M.P. 170° C. $[\alpha]_D^{26} -7°$ (c., 0.97 in dioxan), $\lambda_{infl.}$ 220 mμ (ε, 7000), $\lambda_{infl.}$ 228 mμ (ε, 5300), $\lambda_{max}$ 280 mμ (ε, 2000), $\lambda_{max}$ 286 mμ (ε, 1,800), $\nu_{max.}^{Nujol}$ 2260, 1620, 1586, 1496, 1280, 1138 cm.$^{-1}$ $\nu_{max.}^{CH_2Cl_2}$ 3590 cm.$^{-1}$

EXAMPLE 3

*17α-trifluoropropynyl-1-methyl-oestra-1,3,5(10)-trien-3,17β-diol*

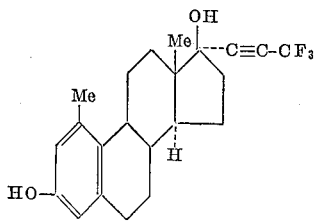

Lithium (0.97 g.) and a trace of ferric nitrate were added to anhydrous liquid ammonia and the mixture was stirred under reflux until the blue colour disappeared, and then cooled to −70° C. 3,3,3-trifluoropropyne (11 ml. measured at approximately −60° C.) was distilled into the mixture, the cooling-bath was removed and the mixture was stirred under reflux for 1 hour. 1-methyl-oesterone (6 g.) (C. Djerassi, G. Rosenkranz, J. Romo, J. Pataki and St. Kaufmann, J. Amer. Chem. Soc., 1950, 72, 4540) in anhydrous tetrahydrofuran (250 ml.) was added and the mixture was stirred under reflux for 4 hours. Ammonium chloride (5 g.) was added and the ammonia was allowed to evaporate. The residue was extracted with ether, and the ethereal solution was washed with water, dried (Na$_2$SO$_4$) and evaporated at reduced pressure. Purification by chromatography on alumina, eluting with ether, and by recrystallisation from acetone/hexane, afforded solid 17α-trifluoropropynyl-1-methyl-oesterone-1,3,5(10)-trien-3,17β-diol, $\gamma_{max.}^{Nujol}$ 3250, 2250, 1610, 1585, 1495 cm.$^{-1}$ $\gamma_{max.}^{CS_2}$ 1277, 1145 cm.$^{-1}$

EXAMPLE 4

*17α-trifluoropropynyl-4-methyl-oestra-1,3,5(10)-trien-17β-ol*

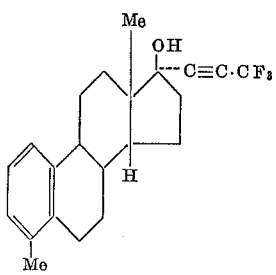

Lithium (0.25 g.) and a trace of ferric nitrate were added to anhydrous liquid ammonia (100 ml.) and the mixture was stirred under reflux until the blue colour disappeared, and then cooled to −70° C. 3,3,3-trifluoropropyne (6 ml. measured at approximately −60° C.) was distilled into the mixture, the cooling-bath was removed and the mixture was stirred under reflux for 15 minutes. 4-methyl-oestra-1,3,5(10)-trien-17-one (0.92 g.) in anhydrous tetrahydrofuran (130 ml.) was added over 15 minutes, and the mixture was stirred under reflux for 2½ hours. Ammonium chloride (4 g.) was added and the ammonia was allowed to evaporate. The residue was extracted with ether and the ethereal solution was washed with water, dried (Na$_2$SO$_4$) and evaporated at reduced pressure. Purification by chromatography on alumina, eluting with mixtures of toluene and ether, and by recrystallisation from aqueous methanol afforded solid 17α-trifluoropropynyl-4-methyl-oestra-1,3,5(10)-trien-17β-ol, M.P. 128° to 128.5° C., $[\alpha]_D^{26} -146°$ (c., 0.93 in dioxan), $\lambda_{max}$ 262.5 mμ (ε 222), $\lambda_{max}$ 269.5 mμ (ε 169).

EXAMPLE 5

*17α-trifluoropropynyl-oestra-1,3,5(10)-trien-17β-ol*

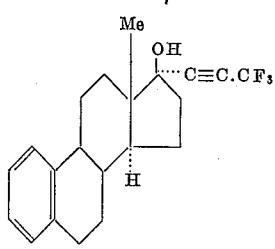

Lithium (0.50 g.) and a trace of ferric nitrate were added to anhydrous liquid ammonia (100 ml.) and the mixture was stirred under reflux until the blue colour disappeared and then cooled to −70° C. 3,3,3-trifluoropropyne (5 ml. measured at approximately −70° C.) was distilled into the mixture, the cooling bath was removed and the mixture was stirred under reflux for 45 minutes. Oestra-1,3,5(10)-trien-17-one (2.07 g.) in anhydrous tetrahydrofuran (200 ml.) was added dropwise and the mixture was stirred under reflux for 2 hours. Ammonium chloride (5 g.) was added and the ammonia was allowed to evaporate. The residue was extracted with ether and the ethereal solution was washed with water, dried (Na$_2$SO$_4$) and evaporated at reduced pressure. Purification by chromatography on alumina, eluting with mixtures of toluene and ether and by crystallisation from aqueous methanol afforded 17α-trifluoropropynyl-oestra-1,3,5(10)-trien-17β-ol, $\lambda_{max}$ 266 mμ (ε 441), $\lambda_{max}$ 274 mμ (ε, 465), $\gamma_{max.}^{CCl_4}$ 3600, 2250 cm.$^{-1}$ When administered orally in rats, 17α-trifluoropropynyl-3-methoxy-oestra-1,3,5(10)-trien-17β-ol had claudogenic and oestrogenic activities approximately equal to those of 17α - chloroethynyl - 3,17β - dimethoxy-oestra-1,3,5(10)- triene; 17α-trifluoropropynyl-3,17β-dimethoxy-oestra-1,3,5(10)-triene had one third of the claudogenic activity and one sixtieth of the oestrogenic activity of ethynyl oestradiol; 17α - trifluoropropynyl-oestra-1,3,5(10)-trien-3,17β-diol had three times the claudogenic activity and one tenth of the oestrogenic activity of 17α-chlorethynyl-3,17β-dimethoxy-oestra-1,3,5(10)-triene. These compounds may be of value in formulations of oral contraceptives which may be administered as pills or tablets or in other standard pharmaceutical forms according to a 20 day/month regimen or in sequential or serial regimens. The high ratios of claudogenic activity to oestrogenic activvity of 17α-trifluoropropynyl-3,17β-dimethoxy-oestra - 1,3,5(10) - triene and of 17α-trifluoropropynyl-oestra-1,3,5(10)-triene are particularly valuable properties for the preparation of novel contraceptive formulations.

We claim:

1. A process for the preparation of a corresponding 17α-(3′,3′,3′ - trifluoroprop-1′-ynyl)-17β-hydroxy derivative of an oestra-1,3,5(10)-triene of the formula

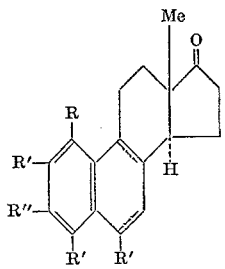

where R is selected from the group consisting of H and Me, R′ is selected from the group consisting of H, Me, Cl and F, R″ is selected from the group consisting of H, OH and OR‴, and R‴ is an alkyl group containing up to 5 carbon atoms, which process comprises reacting said oestra-1,3,5(10)-triene with lithium trifluoropropynyl.

2. The process of claim 1 wherein the lithium trifluoropropynyl is prepared by condensing gaseous 3,3,3-trifluoropropyne into a suspension of lithamide in liquid ammonia and the oestra-1,3,5(10)-triene is added in solution in an anhydrous non-hydroxylic solvent.

3. A process as claimed in claim 1 wherein the oestra-1,3,5(10)-triene starting material is in solution in ether or tetrahydrofuran.

4. A process as claimed in claim 1 wherein the lithium trifluoropropynyl is prepared by condensing gaseous 3,3,3-trifluoropropyne into a suspension of lithamide in liquid ammonia.

5. A process for the preparation of the corresponding 17α-(3′,3′,3′-trifluoroprop-1′-ynyl)-17β-alkoxy derivative of an oestra-1,3,3(10)-triene of the formula

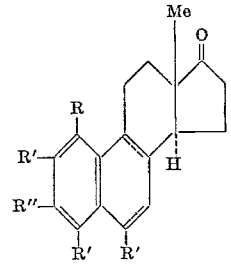

where R is selected from the group consisting of H and Me, R′ is selected from the group consisting of H, Me, Cl, and F, R″ is selected from the group consisting of H, OH and OR‴, and R‴ is an alkyl group containing up to 5 carbon atoms, which process comprises reacting the oestra-1,3,5(10)-triene with a derivative of 3,3,3-trifluoroprop-1-yne in which the atom of hydrogen has been replaced by an equivalent of a metal selected from the group consisting of lithium, sodium, potassium, calcium, magnesium and zinc, including the mono-Grignard derivatives, adding the 17α-(3′,3′,3′ - trifluoroprop - 1′ - ynyl)-17β-hydroxy steroid so formed to an excess of sodamide in liquid ammonia, and thereafter adding an alkyl halide to form the corresponding 17α-(3′,3′,3′ - trifluoroprop-1-ynyl)-17β-alkoxy derivative of the oestra-1,3,5(10)-triene.

6. A process as claimed in claim 5 wherein the 17β-hydroxy derivative is in solution in tetrahydrofuran.

7. A process as claimed in claim 5 wherein the alkyl halide is methyl iodide.

8. 17α-trifluoropropynyl-oestra-1,3,5(10)-triene-17β-ol.

9. 17α-trifluoropropynyl - 4 - methyl-oestra-1,3,5(10)-trien-17β-ol.

References Cited
UNITED STATES PATENTS 3,253,004   5/1966   Fried et al. _____ 260—397.5

ELBERT L. ROBERTS, *Primary Examiner*.

LEWIS GOTTS, *Examiner*.